Aug. 14, 1934.  E. A. ASH  1,970,161
APPARATUS FOR MUSIC INSTRUCTION
Filed June 21, 1933  2 Sheets-Sheet 1
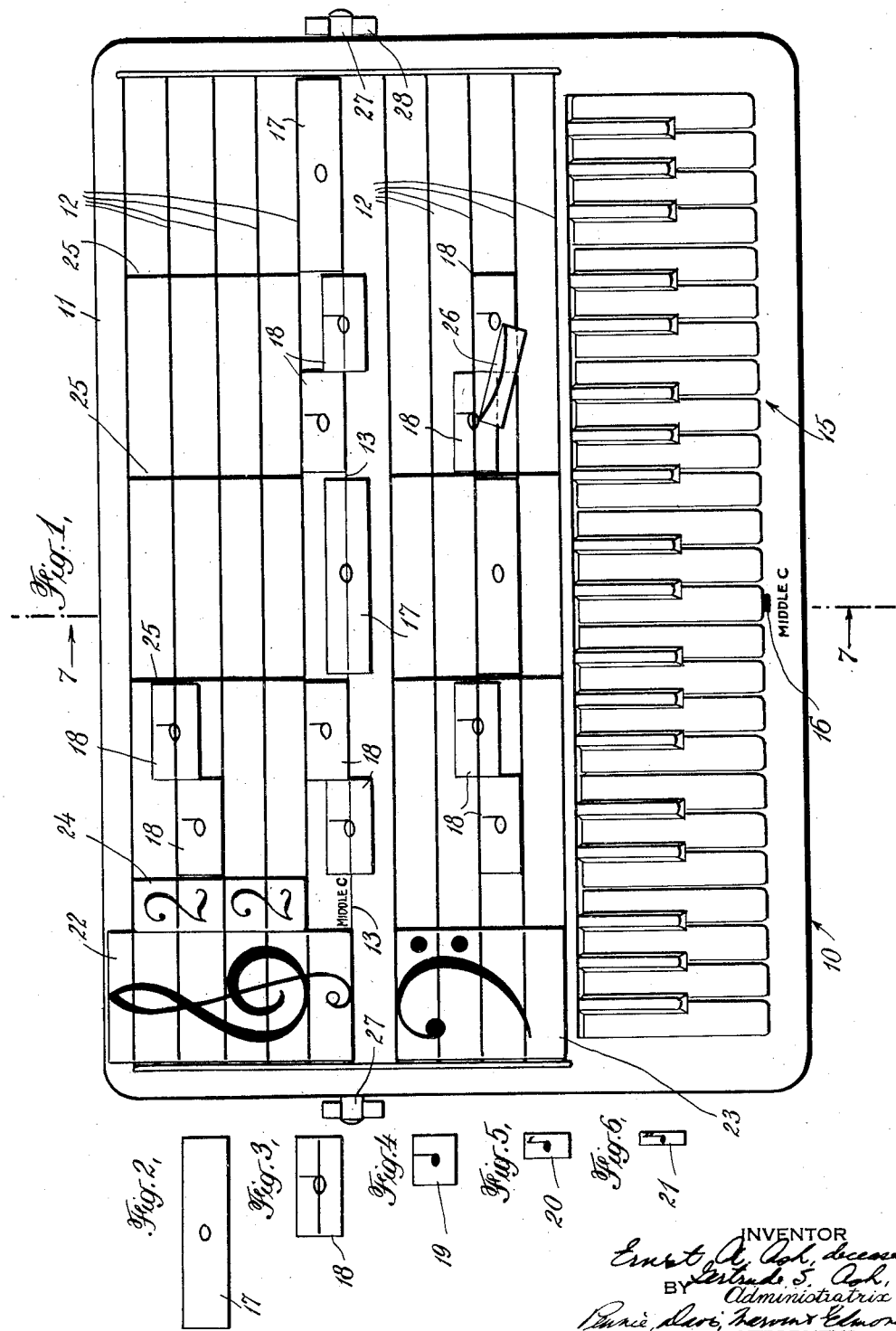

Aug. 14, 1934.  E. A. ASH  1,970,161
APPARATUS FOR MUSIC INSTRUCTION
Filed June 21, 1933    2 Sheets-Sheet 2
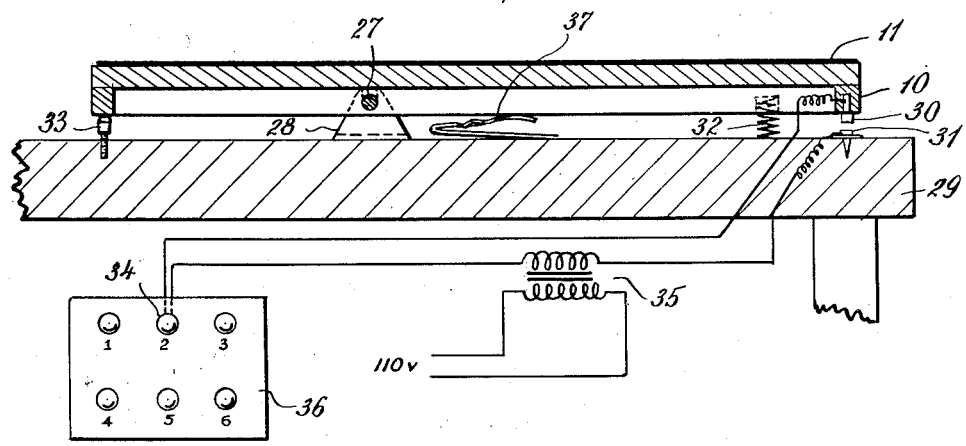
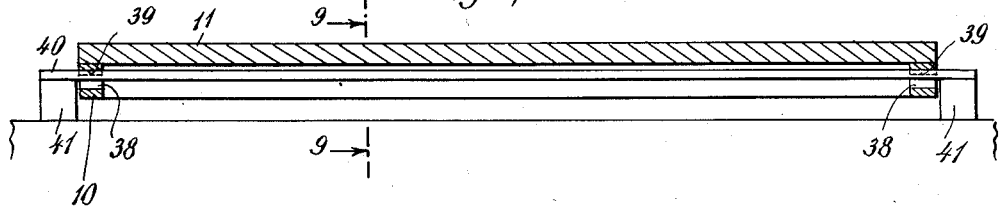
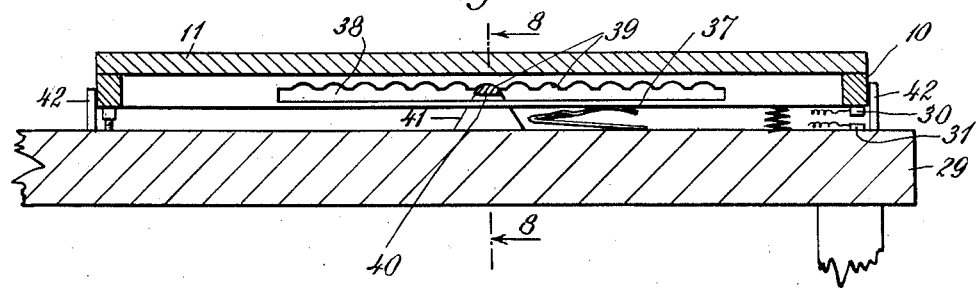

Patented Aug. 14, 1934

1,970,161

UNITED STATES PATENT OFFICE 1,970,161

APPARATUS FOR MUSIC INSTRUCTION

Ernest A. Ash, deceased, late of Brooklyn, N. Y., by Gertrude S. Ash, Brooklyn, N. Y., administratrix, assignor to Gertrude S. Ash, Brooklyn, N. Y.

Application June 21, 1933, Serial No. 676,838

7 Claims. (Cl. 84—478)

This invention relates to apparatus for music instruction and has particular reference to apparatus for developing the sense of harmony, rhythm, melody and technique of the student by mechanical means.

In accordance with this invention, apparatus is provided in which the student employs counters, or the like, representing characters or symbols ordinarily used in music notation, these counters being of different sizes in accordance with the time values of the notes, rests, or other musical symbols which they represent, and arranges them on a counting board which represents the great musical staff, in accordance with instructions given by the instructor or by other source of instruction.

The counting board or another board adjacent thereto, is provided with a representation of the keyboard of the piano or other instrument in which the student is receiving instruction. The counting board or other board is pivoted at approximately its transverse center line about an axis, so that it moves about this axis in response to pressure applied to the keyboard representation thereof by the student in initiating the act of playing the corresponding instrument. The board is provided with springs, a counter-balance, or the like, which tends to oppose the movement of the board by the student and restores the board to its normal position when the pressure thereon is released. Movement of the board in response to pressure applied thereto by the student closes electrical contacts in the circuit of an electric lamp or other electrical indicator, and also preferably actuates an audible indicator which indicates movement of the board from and preferably also to its normal position. The pivot of the board is preferably adjustable, so that more or less pressure thereon may be required to operate the indicator or indicators.

With this arrangement, the student is not only taught to arrange the counters representing notes or other musical characters in accordance with their values, which are proportional to their sizes, but also uniform arm pressure and touch of the student is cultivated by teaching him to move from certain key representations of the simulated piano keyboard to other key representations without changing the pressure of his arms, for if he does so, the lamp will flicker and indicate to his instructor that the finger action is not correct and the audible indicator indicates this condition to the student. Also, by adjusting the pivot of the board so that more or less pressure thereon is required to operate the indicators, the proper key-pressure sense of the student is developed.

In this way the natural sense of harmony, rhythm, melody and technique of the student is developed rapidly, naturally, and effectively with the apparatus of this invention. Preferably, a number of the devices are arranged in rows to accommodate a number of students at the same time, and the several lamps or other indicators of the several devices are arranged in a panel in the manner of an annunicator, so that an instructor may observe the progress of any number of students by watching the corresponding indicators.

For a more complete understanding of the invention, reference may be had to the accompanying drawings, in which Figure 1 is a plan view of the apparatus of this invention, showing the counting board upon which the counters are arranged;

Figure 2 is a counter adapted to be placed on the counting board and being of a size representing a whole note;

Figures 3, 4, 5 and 6 are similar counters of half, quarter, eighth and sixteenth note sizes;

Figure 7 is a transverse section through the apparatus as seen along the line 7—7 of Figure 1, illustrating the operating mechanism thereof, the indicating portion of which is shown schematically;

Figure 8 is a longitudinal section through a modified form of the apparatus as seen along the line 8—8 of Figure 9; and Figure 9 is a transverse section through the modified form of the apparatus as seen along the line 9—9 of Figure 8.

Referring to these drawings, numeral 10 designates a rectangular frame of wood, or the like, bearing a counting board 11 of thin metal, wood, ply-board, heavy cardboard, or the like, on which are inscribed, printed, or otherwise indicated, by heavy lines 12 two musical staves separated by a more lightly ruled line 13 denoting "middle C". Along the lower edge of the counting board 11, as seen in Figure 1, is a representation 15 of the keyboard of a piano, although it may be the representation of the keyboard, or fingerboard of another instrument, depending upon requirements. "Middle C" is indicated at 16 on this keyboard representation.

A plurality of counters of cardboard, ply-board, wood, sheet metal, celluloid, or the like, and representing various musical symbols, are provided for arrangement on the counting board 11, in accordance with exercises or lessons of instruction, or the like. Each of these counters not only bears a recognized musical symbol such as a note, or the like, but also is of a size which, in comparison with similar counters of different sizes, designates a definite musical time value, so that, by observing the physical size of the counter, the duration of each note may be readily determined at a glance by the student.

Thus, the counter 17, illustrated in Figure 2, is of such length as to represent a whole note, while the counter 18, illustrated in Figure 3 is half the length of the whole note counter 17 and accordingly represents a half note. Similarly, counter 19 of Figure 4, being a quarter of the length of counter 17, represents a quarter note while counters 20 and 21 of Figures 5 and 6 are of appropriate lengths to represent eighth and sixteenth notes, respectively. The width of the counters 17, 18, 19, 20 and 21 is equal to the space between lines 12 of the staves of the counting board.

This method of representing time values by sizes of the counters is also applied to other musical symbols as well as notes. Accordingly, counters representing "rests" are of such size that a half rest counter is half the length of a whole rest counter, and quarter, eighth and sixteenth rest counters are of corresponding proportions.

In addition to the proportional counters, standard symbol counters 22 and 23, representing the treble and bass clefs, respectively; 24, representing the time signature indicating 2, 4 or "half", "quarter" time; 25, representing measure bars; 26, representing the slur or tie, and the like, are provided, as indicated in Figure 1.

These counters are preferably kept in drawers, or in pigeon-holes of a rack adjacent the counting board 11, the drawers or pigeon-holes being of appropriate length, so that the time values of the counters contained therein will be determined at a glance at the sizes of the drawers or pigeon-holes. Also, the counters preferably bear symbols on opposite sides of the same or similar values.

It will be noted that the spacing of the counters 25 representing the measure bars, in accordance with the time signature counters 24, allows sufficient lateral space between the measure bars to accommodate a counter or a combination of counters having proper musical time value to fulfill the requirements of the time signature 24. This precludes the possibility of giving too much time value to a measure and, if too little time is represented by counters in the measure, the inadequacy may be readily observed by sight and corrected.

The counting board 11, or a similar board, mounted adjacent to, such as beneath, the counting board and exposed by lifting the counting board and provided with the representation 15 of the piano keyboard or other instrument, is pivoted at 27 intermediate its front and rear edges about a longitudinal axis, the location of which is such that a firm, substantial pressure is required on the front edge of the board to move it about its axis. The pivot 27 is preferably formed by pins or the like attached to the frame 10 and mounted on blocks 28 resting on table 29. As illustrated in Figure 1, the representation 15 of the piano keyboard extends across the front of the board 11.

Mounted on the front edge of the frame 10 is an electrical contact 30 which cooperates with an electrical contact 31 mounted on table 29. The front edge of board 11 and its frame 10 are urged upwardly by springs 32 located adjacent the front of the counting board 11, so that contacts 30 and 31 are normally disengaged, the upward movement of the front of the board under the influence of springs 32 being limited by an adjustable stop 33 mounted on the table 29 and engaging the rear edge of the board frame 10. Electrical contacts 30 and 31 are arranged in the circuit of a suitable annunciator, such as lamp 34 or other visual signal, this circuit being energized from a suitable source of current, such as a battery, or from the 110-volt lighting circuit, through transformer 35.

A plurality of these pivoted boards are arranged side by side, or otherwise, in a group, and each of them is provided with a corresponding annunciator lamp, all of the annunciator lamps being mounted on an annunciator board or panel 36, so that simply by observing the illumination of the lamps on the annunciator board 36, the instructor is informed which of the sets of contacts 30—31 are closed.

In addition to the visual indication afforded by the annunciator lamp 34, the pivoted board is provided with an audible indicator which preferably takes the form of a mechanical clicking device of the type generally known as a "cricket" and indicated at 37 in Figure 7. These devices are well known and produce a click when the two arms thereof are squeezed together and again when the arms are released. The cricket 37 is ordinarily of sufficient resiliency to elevate the front of board 11, so that contacts 30 and 31 are normally disengaged, whereby springs 32 may be eliminated.

In operating the apparatus of this invention, the student depresses the board 11 to close contacts 30 and 31, which results in the illumination of annunciator lamp 34. The student is instructed to maintain uniform arm pressure on the keyboard representation 15 when moving his fingers from one position on the keyboard to another, which is indicated by the uniform illumination of the corresponding annunciator lamp. If the finger or arm action of the student is incorrect in this respect, such as when he strikes the keyboard representation 15 and then releases it, the springs 32 will raise the front of the counting board 11 and open contacts 30 and 31, causing the annunciator lamp 34 to flicker. The annunciator board 36 is preferably not visible to the students, but only to the instructor; but the student is informed by the clicking of the audible indicator 37 if he relieves pressure on the counting board 11 due to incorrect arm control.

With this apparatus, by going through a series of finger exercises in accordance with definite instructions, the sense of touch and uniform arm pressure of the student is cultivated.

With the modified form of the apparatus of this invention illustrated in Figures 8 and 9, the key pressure sense of the student may be corrected according to the individual needs of the student, this form of the apparatus being adjustable, so that more or less pressure is required by the student to close the contacts 30 and 31 and maintain them closed. In this modified form of the apparatus, the side members of the frame 10 of the counting board are provided with horizontal slots 38, the upper edegs of which are serrated or provided with notches 39 for the reception of the movable pivot or fulcrum 40, the ends of which are supported on blocks 41 slidable along the top surface of table 29. Aside from guides 42 on the front and rear edges of the counting board 11 to keep it in position with respect to the movable fulcrum 40, the apparatus is the same as that illustrated in Figure 7.

Accordingly, by moving the fulcrum 40 forwardly a greater arm pressure is required to close contacts 30 and 31. Conversely, by moving the fulcrum 40 rearwardly less finger pressure is required to close contacts 30 and 31. With this modified form of the apparatus of this invention, if the arm pressure of a student is too light, fulcrum 40 is moved forwardly so that the student must exert a greater arm pressure to close contacts 30 and 31, whereby he is taught to exercise greater force on the keyboard of the actual instrument, as well as on the simulated keyboard 15. By moving the fulcrum 40 rearwardly, the opposite result is achieved. Although the adjustable fulcrum form of the invention is preferred, the same effect may be procured in other ways, such as by adjusting the tension of springs 32 moving them to and from the fulcrum 40, and the like.

It will be seen that with the apparatus of this invention the sense of harmony, rhythm, melody and technique of the student is cultivated by mechanical means before the student receives instruction on the actual instrument which he is learning to play, and while each student has some natural sense of music, many of the required functions of playing an instrument properly need further development, and the present apparatus provides means for such development. For example, the student is taught the values of the musical symbols by means of the counters and the proper finger movement and touch by exercises on the pivoted board.

While certain preferred embodiments of the invention have been illustrated and described herein, it is to be understood that the invention is not limited thereby, but is susceptible of many changes in form and detail within its scope.

What is claimed is:—

1. In music instruction apparatus, the combination of a board having a representation of the keyboard of a musical instrument, a support for the board permitting movement thereof in response to pressure applied to the keyboard representation thereof, and signal means actuated by movement of the board.

2. In music instruction apparatus, the combination of a board having a representation of the keyboard of a musical instrument, a support for the board permitting movement thereof in response to pressure applied to the keyboard representation thereof, electrical circuit-controlling means actuated by movement of the board, and a signal controlled by said means.

3. In music instruction apparatus, the combination of a board having a representation of the keyboard of a musical instrument, a pivot for the board intermediate two opposite edges thereof, electrical contacts closable by movement of the board in response to pressure applied thereto, means normally opposing movement of the board to keep said contacts open, a signal in the circuit of the contacts, and means for relatively adjusting the board and its pivot to vary the degree of pressure required on the board to close the contacts.

4. A music instruction apparatus comprising a support, a board provided with a representation of the musical staff on one portion thereof and a representation of the keyboard of a musical instrument on another portion thereof, said board being pivotally supported by said support, whereby pressure on any one of the key representations will cause a pivotal movement of the board.

5. A music instruction apparatus comprising a support, a board provided with a representation of the musical staff on one portion thereof and a representation of the keyboard of a musical instrument on another portion thereof, said board being pivotally supported by said support, whereby pressure on any one of the key representations will cause a pivotal movement of the board, and means for normally opposing movement of the board about its pivot.

6. A music instruction apparatus comprising a support, a board provided with a representation of the musical staff on one portion thereof and a representation of the keyboard of a musical instrument on another portion thereof, a plurality of counters representing musical symbols arrangeable on the board, said board being pivitally supported by said support, whereby pressure on any one of the key representations will cause a pivotal movement of the board.

7. A music instruction apparatus comprising a support, a board provided with a representation of the musical staff on one portion thereof and a representation of the keyboard of a musical instrument on another portion thereof, a plurality of counters representing musical symbols arrangeable on the board, said board being pivotally supported by said support, whereby pressure on any one of the key representations will cause a pivotal movement of the board, and means for relatively adjusting the board with respect to said pivot, whereby the amount of pressure necessary to cause movement of the board may be varied.

GERTRUDE S. ASH,
*Administratrix of Ernest A. Ash, deceased.*